(12) United States Patent
Strauss

(10) Patent No.: US 7,154,996 B2
(45) Date of Patent: Dec. 26, 2006

(54) DYNAMIC FREQUENCY PASSBAND SWITCHING IN HOME PHONE-LINE NETWORKS

(75) Inventor: Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 314 days.

(21) Appl. No.: 10/282,496

(22) Filed: Oct. 29, 2002

(65) Prior Publication Data

US 2004/0081298 A1  Apr. 29, 2004

(51) Int. Cl.
H04M 11/00 (2006.01)

(52) U.S. Cl. ............................ 379/93.08; 379/90.01

(58) Field of Classification Search ............ 379/90.01, 379/93.08, 93.01, 93.28, 93.31, 93.09; 375/222
See application file for complete search history.

(56) References Cited

U.S. PATENT DOCUMENTS

| 6,061,392 | A | * | 5/2000 | Bremer et al. ............. 375/222 |
| 6,240,166 | B1 | * | 5/2001 | Collin et al. ............. 379/93.08 |
| 6,324,268 | B1 | * | 11/2001 | Balachandran et al. ... 379/93.08 |
| 6,522,730 | B1 | * | 2/2003 | Timm et al. ............. 379/93.08 |
| 6,522,731 | B1 | * | 2/2003 | Matsumoto ............. 379/93.08 |
| 6,532,279 | B1 | * | 3/2003 | Goodman ............... 379/90.01 |
| 6,532,280 | B1 | * | 3/2003 | McDonald .............. 379/93.08 |
| 6,754,186 | B1 | * | 6/2004 | Bullman .................. 375/222 |
| 6,785,296 | B1 | * | 8/2004 | Bell ........................ 370/352 |
| 2004/0004974 | A1 | * | 1/2004 | Gaspar ..................... 370/463 |
| 2004/0107445 | A1 | * | 6/2004 | Amit ........................ 725/127 |

* cited by examiner

Primary Examiner—Stella Woo

(57) ABSTRACT

A method of dynamic spectral bandwidth allocation in home phone-line networking (HPN). An HPN terminal is configured to sense transmission activity in a frequency sub-band corresponding to a broad-band high-speed service, such as ADSL. If no activity is detected, the HPN terminal uses the sub-band for communication with other HPN terminals. As a result, major impediments to HPN networking, such as crosstalk from neighboring home networks and signal attenuation due to the unpredictable topology of the in-home wiring, are minimized or possibly mitigated. In addition, the capacity accessible to HPN terminals may be increased. Consequently, the robustness of HPN networking is improved and higher data throughput rates may be supported.

22 Claims, 6 Drawing Sheets

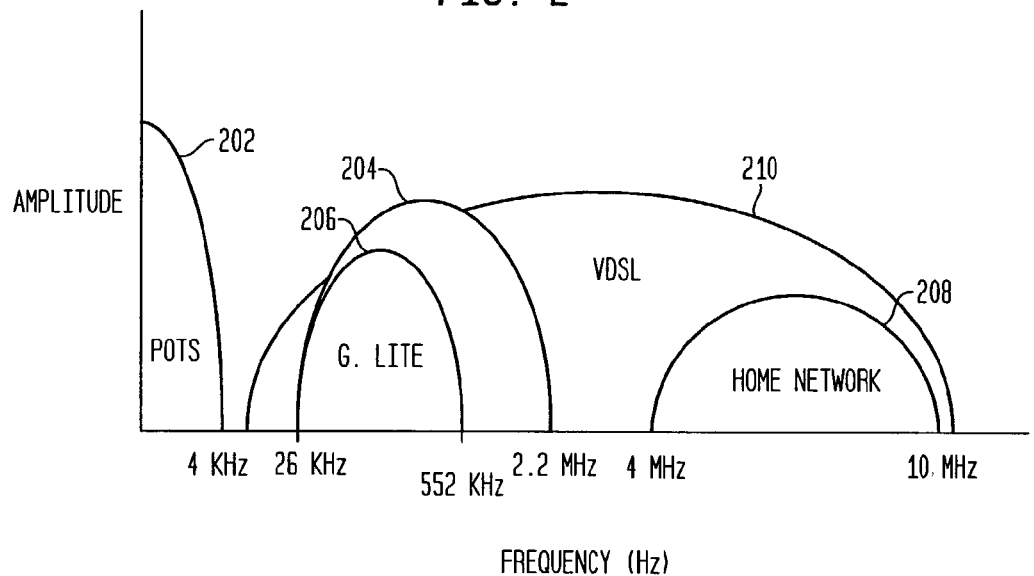
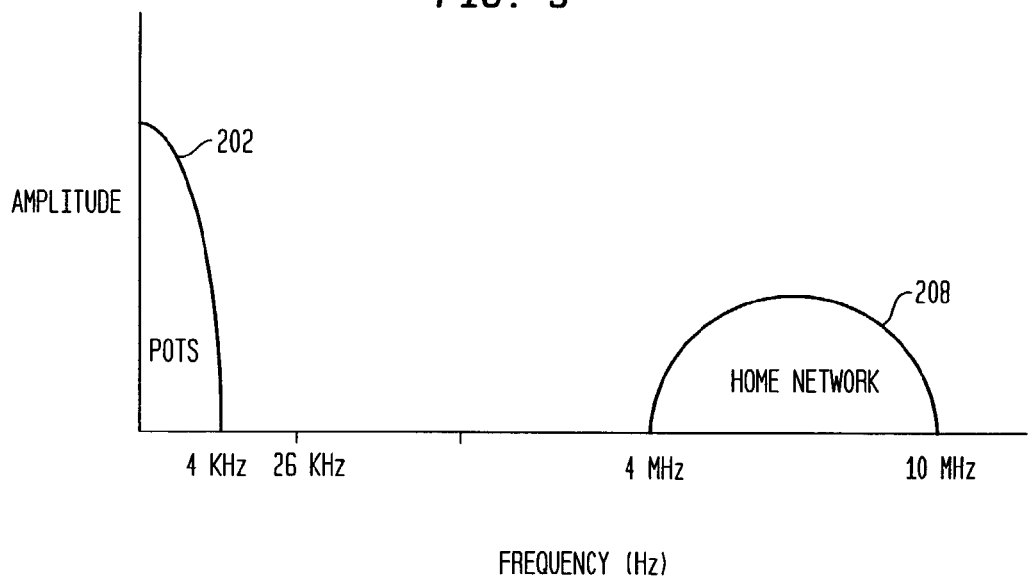

DYNAMIC FREQUENCY PASSBAND SWITCHING IN HOME PHONE-LINE NETWORKS

BACKGROUND OF THE INVENTION

1. Field of the Invention

The present invention relates to communication equipment and, more specifically, to home phone-line networking (HPN).

2. Description of the Related Art

HPN networking is a segment of the networking marketplace that is relatively new. In 1998, the computer and semiconductor industries created the Home Phone-Line Networking Alliance (HPNA) to select, promote, and standardize technologies for HPN. The HPNA has introduced two generations of HPN technology (HPNA 1.0 and 2.0) that are well-suited for the interconnection of broad-band voice, video, and data and/or internet, peripheral, and file sharing within a home. The HPNA is cunently working on a third-generation technology.

HPN signals are imposed on the existing telephone wiring inside a home or office to implement a local communication network between HPN terminals, such as computers, peripherals, and internet appliances. However, one challenge of HPN networking is that the same physical medium, e.g., the existing copper plant, is shared with other services, such as, telephones, answering machines, FAX machines, and modems. In addition, networking over the existing infrastructure may suffer from various impairments, such as signal attenuation, e.g., due to line attenuation and/or the lack of proper termination, and crosstalk from neighboring networks. Furthermore, the characteristics (e.g., impedance) of the infrastructure may change randomly when, e.g., a telephone goes off-hook or an additional device is introduced into the network or is taken "off-hook".

SUMMARY OF THE INVENTION

The problems in the prior art are addressed in accordance with the principles of the present invention by providing a method of dynamic spectral bandwidth allocation in home phone-line networking (HPN). An HPN terminal (e.g., a networked computer) is configured to sense transmission activity in a frequency sub-band corresponding to a broad-band high-speed service, such as ADSL. If no activity is detected, the HPN terminal uses the sub-band for communication with one or more different HPN terminal(s) (e.g., a networked printer). As a result, major impediments to HPN, such as crosstalk from neighboring home networks and signal attenuation due to the unpredictable topology of the in-home wiring, are minimized or possibly mitigated. In addition, the capacity accessible to HPN terminals may be increased. Consequently, the robustness of HPN is improved and higher data throughput rates may be supported.

According to one embodiment, the present invention is, in a home phone-line network (HPN), comprising two or more HPN terminals configured to communicate using an HPN frequency band, a method of data transmission between the terminals, the method comprising the steps of: (A) sensing transmission activity within a frequency sub-band outside the HPN frequency band; and (B) allocating the sub-band to the HPN network, if no transmission activity is detected within the sub-band in step (A).

According to another embodiment, the present invention is a networking device for use with a communication terminal, the terminal configurable for data transmission via a home phone-line network using an HPN frequency band, the device comprising: (i) a sensor configured to sense transmission activity within a frequency sub-band outside the HPN frequency band; and (ii) a processor connected to the sensor and configured to allocate the sub-band for the data transmission via the HPN network, if no transmission activity is detected by the sensor within the sub-band.

According to yet another embodiment, the present invention is a networking device for use with a communication terminal, the terminal configurable for data transmission via a home phone-line network using an HPN frequency band, the device comprising: (i) means for sensing transmission activity within a frequency sub-band outside the HPN frequency band; and (ii) means for allocating the sub-band for the data transmission via the HPN network, if no transmission activity is detected by the means for sensing within the sub-band.

BRIEF DESCRIPTION OF THE DRAWINGS

Other aspects, features, and advantages of the present invention will become more fully apparent from the following detailed description, the appended claims, and the accompanying drawings in which:

FIG. 2 illustrates a representative spectrum of signals distributed via the home telephone wiring in the network of FIG. 1;

FIG. 3 illustrates a representative spectrum of signals distributed via the home telephone wiring in a home phone-line network configured with a gateway or non-ADSL system;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
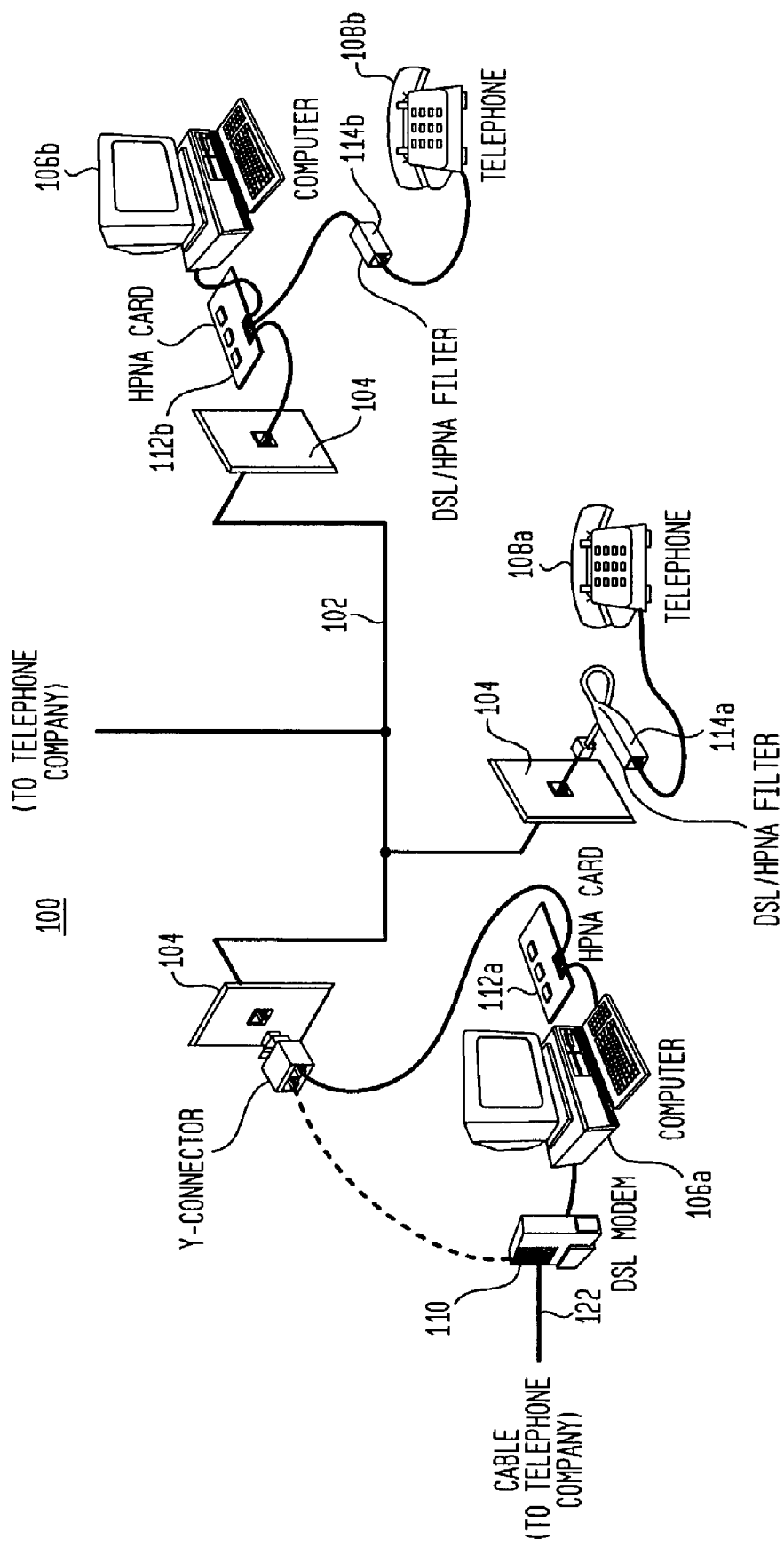
FIG. 1 illustrates a representative HPN network.

FIG. 1 illustrates a representative home phone-line network 100. Network 100 includes a plurality of devices, such as computers 106*a–b*, telephones 108*a–b*, and a modem 110, connected to home telephone wiring 102 using telephone jacks 104. Depending on the configuration, wiring 102 may be further connected to a service provider, such as a telephone company. To enable HPN networking, each HPN terminal (illustratively, in network 100, each networked computer 106*a–b*) is equipped with an appropriate HPNA device (e.g., the corresponding HPNA card 112*a–b*). In addition, computer 106*a* is connected to modem 110 to enable a broad-band service, such as ADSL. Depending on the particular configuration of network 100, modem 110 may be a cable modem connected to a service provider (e.g., a telephone company) via a separate line (e.g., cable) 122 or a regular modem connected to the service provider via wiring 102. Each telephone 108a–b may be connected to wiring 102 using a corresponding optional filter 114a–b. Typically, filters 114a–b are low-pass filters that allow the low-frequency (e.g., plain old telephone service, POTS) signals to pass through to the telephone while blocking the high-frequency (e.g., ADSL and/or HPNA) signals. Similar filters may also be used with fax or answering machines (not shown) connected to wiring 102.

Home phone-line networks, similar to network 100, may be configured in a variety of ways and include a variety of HPN terminals. For example, a home phone-line network may be configured with a gateway system (not shown). In a gateway configuration, broad-band high-speed (xDSL) services (e.g., ADSL, G.Lite, and VDSL) are provided to the home and are substantially terminated at the gateway box, which then provides the appropriate filtering and signal isolation and distributes information throughout the home via the home telephone wiring (e.g., using wiring 102 of network 100). Additional examples of an HPN terminal include, without limitation, an IP telephone or video phone, a digital set-top box, a wireless access device, a peripheral device, or an information appliance.

FIG. 2 illustrates a representative spectrum of frequency division multiplexed (FDM) signals distributed via wiring 102 in network 100. More specifically, band 202 corresponds to POTS and occupies the spectral region below about 4 kHz; band 204 corresponds to ADSL and is located between about 26 kHz and 2.2 MHz; band 206 corresponds to G.Lite and is a sub-band of band 204 located between about 26 and 552 kHz; and band 208 corresponds to HPN and is located between about 4 and 10 MHz. Band 208 includes two sub-bands (not shown): a first sub-band between about 5.5 and 9.5 MHz and a second sub-band between about 4.25 and 9.75 MHz, the sub-bands corresponding to the HPNA version 1.x and version 2.x technologies, respectively. Additional bands, such as, e.g., band 210 corresponding to VDSL may also be present and be at least partially overlapped with bands 204–208.

FIG. 3 illustrates a representative spectrum of signals distributed via the home telephone wiring in a home phone-line network configured with a gateway system as explained above. In this configuration, signals corresponding to broad-band high-speed services are applied to, filtered, and converted by a gateway box. Consequently, bands 204, 206, and 210 (see FIG. 2) are absent in the spectrum of signals in the home telephone wiring, and bands 202 and 208 are present as shown in FIG. 3. A spectrum substantially similar to that shown in FIG. 3 may also correspond to network 100 of FIG. 1 in a configuration where, for example, modem 110 is a cable modem configured as an HPN terminal (i.e., a device communicating over the HPN network with other HPN terminals, such as computers 106a–b, using an HPNA standard). In addition, the spectrum of FIG. 3 may correspond to a situation when a broad-band high-speed service is not available at the home or is currently inactive.

As already indicated, three major impediments that limit the robustness of HPN are (1) crosstalk from neighboring home networks; and (2) signal attenuation due to the spectral nulls from mismatched terminations; and (3) line attenuation. Spectral properties of each impediment are discussed in more detail below.

Crosstalk occurs when signals from neighboring homes escape into the cable binder that includes a wire connected to wiring 102 and those signals are coupled into that wire. It is known in the art that this type of crosstalk increases by about 15 dB per decade. For example, comparing the 4–10 MHz band to the 0.5–6.5 MHz band, one finds that, for the former, the crosstalk is about 6 dB worse at the lower band-edge, 3 dB worse at the upper band-edge, and 4 dB worse when averaged across the band.

Home telephone wiring, e.g., wiring 102 of network 100, comes in a variety of topologies, possibly including one or more branches (stubs) off the direct path connecting each pair of devices. It may be that some of the branches are not terminated (e.g., a telephone jack with no telephone attached). In addition, many POTS devices (e.g., telephones) do not provide matched terminations at frequencies outside the POTS band (i.e., band 202 in FIG. 2). These factors may result in large signal reflections, which create deep nulls in the transmission spectrum of the wiring. It is known in the art that, at higher frequencies, the nulls tend to become deeper and wider. For example, a 25-foot stub in wiring 102 with infinite termination impedance (e.g., a telephone extension cord that is not plugged into a telephone) produces a null centered at 6.5 MHz with a width of 1.7 MHz (at the 10 dB points). For comparison, a 12-foot stub produces a null centered at 13.5 MHz with a width of 3.4 MHz, thus illustrating that the width of nulls increases with frequency.

A typical type of cable used for home telephone wiring is a 22-gauge quad wire. For this type of wire, average signal attenuation in the 4–10 MHz band is higher by about 8 dB/kft than that in the 0.5–6.5 MHz band. For a typical house with 250 feet of internal wiring, this amounts to an additional loss of 2 dB for the higher frequency band. Other types of wire used for home telephone wiring have analogous frequency characteristics. To summarize, the presented examples indicate that the aforementioned impairments to HPN networking are less pronounced at lower frequencies.

Figure 4:
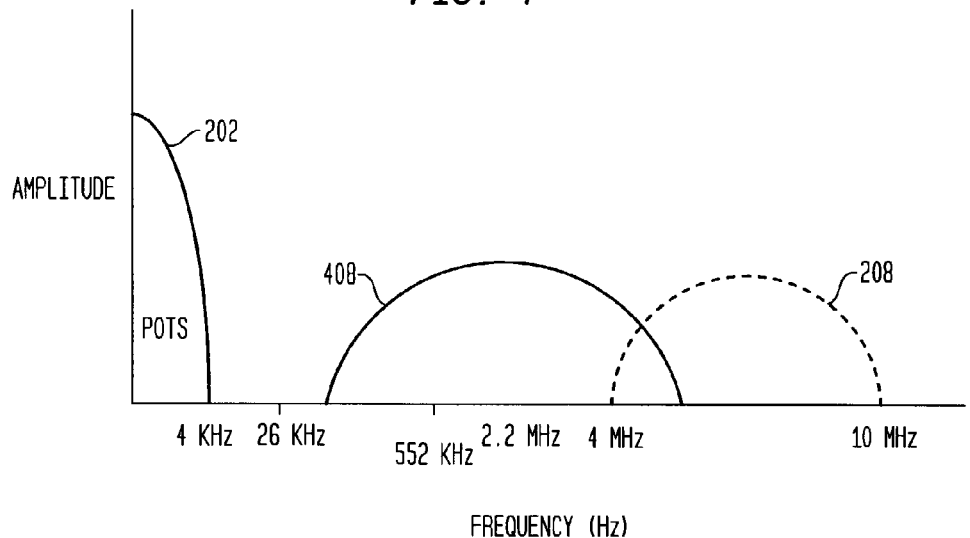
FIGS. 4 and 5 show graphically how the network of FIG. 1 characterized by the spectrum shown in FIG. 3 may be reconfigured according to two illustrative embodiments of the present invention.
Figure 5:
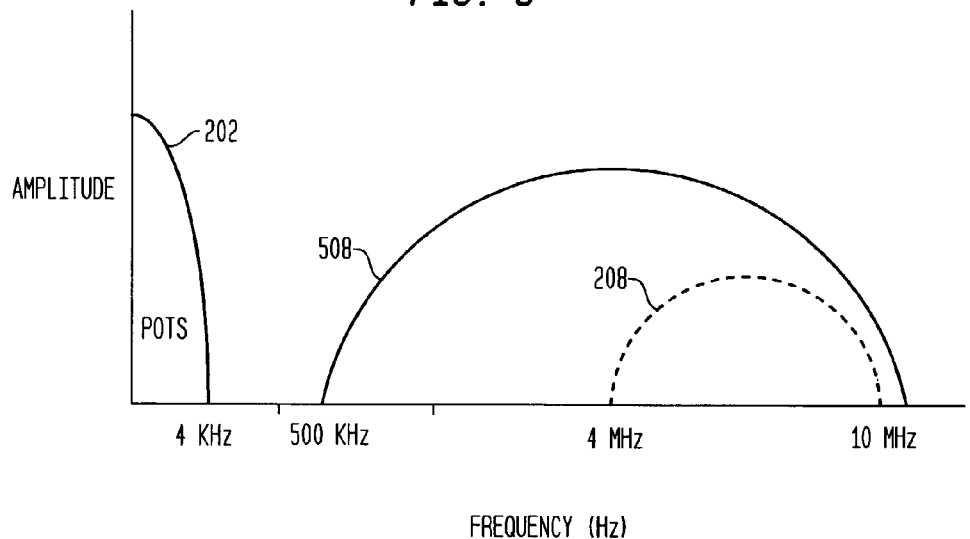

FIGS. 4 and 5 show graphically how network 100 characterized by the spectrum shown in FIG. 3 may be reconfigured according to two illustrative embodiments of the present invention. More specifically, FIG. 4 shows that, in one embodiment, band 208 (FIG. 3) is frequency down-converted to form band 408 (FIG. 4), which utilizes the available spectral window below 4 MHz. In one configuration, band 408 is located between 0.5 and 6.5 MHz. Similarly, FIG. 5 shows that, in another embodiment, band 208 (FIG. 3) is expanded to form band 508 (FIG. 5), which also utilizes the available spectral window below 4 MHz. In one configuration, band 508 is located between 0.5 and 10 MHz. In different configurations, each band 408 or 508 may have one or more sub-bands having boundaries selected based on the availability of spectral windows in the spectral region of interest.

Figure 6:
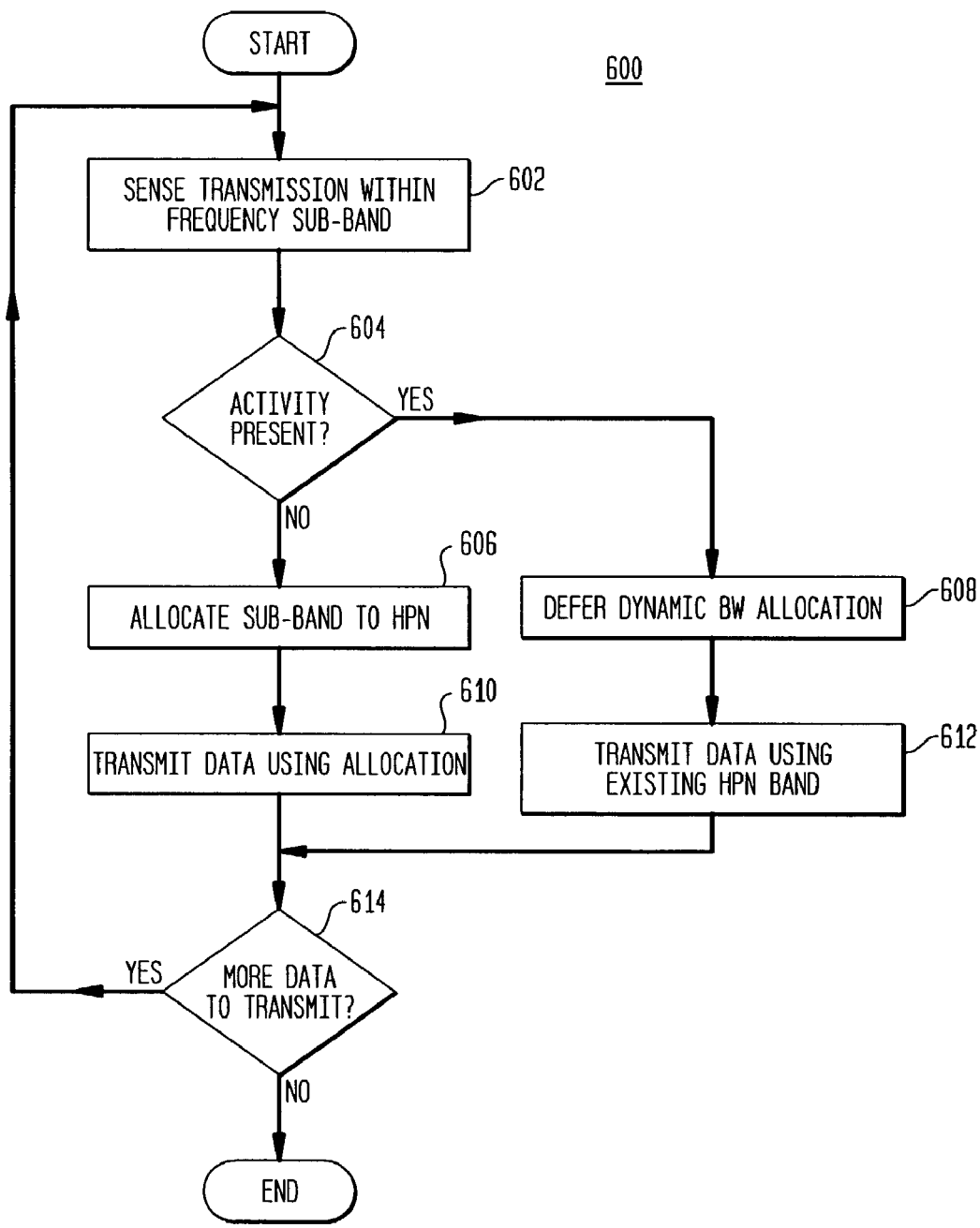
FIG. 6 is a flowchart illustrating a method of dynamic spectral bandwidth allocation in HPN networks according to one embodiment of the present invention.

FIG. 6 is a flowchart illustrating a method 600 of dynamic spectral bandwidth allocation in HPN networks according to one embodiment of the present invention. In step 602, an HPN terminal (e.g., computer 106 with HPNA card 112 in FIG. 1) senses transmission activity in a sub-band outside band 208 (FIG. 2), e.g., the sub-band corresponding to an xDSL service. If it is determined in step 604 that the activity is present (i.e., the xDSL service is active), then the HPN terminal defers dynamic bandwidth allocation in step 608 and proceeds to step 612 to transmit data using the available HPN band (e.g., band 208). However, if it is determined in step 604 that no activity is present, the HPN terminal allocates the sub-band to HPN services in step 606, e.g., as graphically shown in FIG. 4 or FIG. 5. After the allocation, the HPN terminal notifies other HPN terminals on the network, e.g., using messaging between the terminals, about the allocation and proceeds to step 610 to transmit at least a portion of data using the allocated sub-band. Alternatively or in addition, each HPN terminal on the network may be configured to make an independent determination of the availability of the sub-band and make the corresponding allocation. When the transmission is complete, the HPN terminal may optionally de-allocate the sub-band. If it is determined in step 614 that more data (e.g., one or more data packets) need to be transmitted, then processing returns to step 602. In one embodiment, method 600 may be used on a packet-to-packet basis.

Typically, xDSL systems are implemented as discrete multi-tone communication systems that transmit information encoded in multiple tones. Each of the tones corresponds to a modulated carrier signal dedicated to either upstream or downstream transmission. In addition, xDSL systems may include a pilot tone used, for example, for synchronization and/or timing recovery. In one embodiment, the HPN terminal is configured to sense a pilot tone (busy tone) of the xDSL system. In addition, the HPN terminal may also be configured to perform a power spectral density (PSD) test, during which the PSD within the xDSL sub-band is measured.

Figure 7:
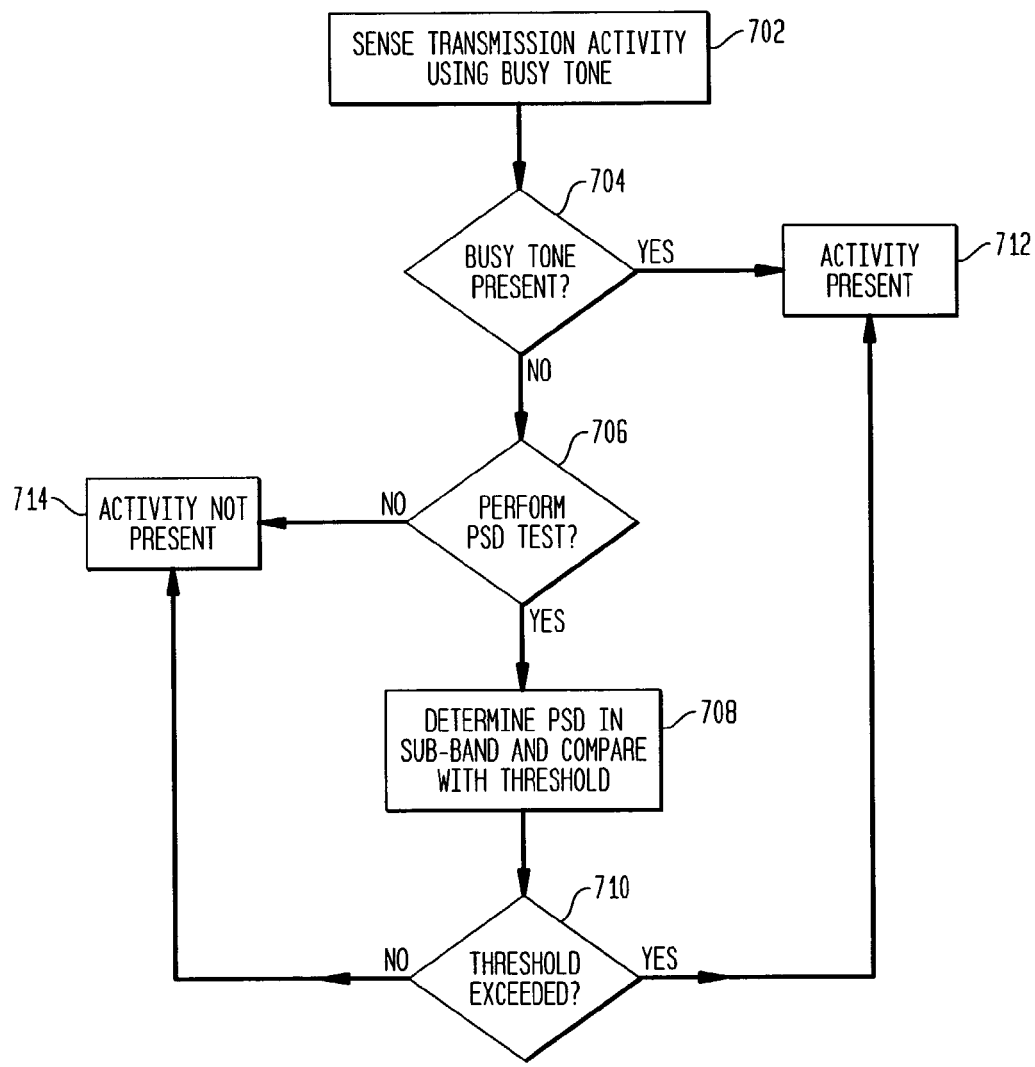
FIG. 7 shows the sensing step of the method of FIG. 6 according to one embodiment of the present invention.

FIG. 7 shows implementation of step 602 according to one embodiment of the present invention. As shown in FIG. 7, in step 702, the HPN terminal senses one or more busy tones corresponding to the xDSL service. In step 704, the HPN terminal compares the detected level of the busy tone(s) with a first threshold value. If the level exceeds the threshold, then it is determined that the busy tone is present implying in step 712 that there is transmission activity within the frequency sub-band. However, if it is determined in step 704 that no busy tone is present, then the HPN terminal proceeds to step 706 where it is decided whether a PSD test should be performed. If no PSD test is to be performed, then the HPN terminal proceeds to step 714 to determine that there is no activity in the sub-band. Alternatively, if a PSD test is required, the HPN terminal proceeds to step 708, during which the PSD within the sub-band is measured and compared with a second threshold value. If it is determined in step 710 that the second threshold value is exceeded, the HPN terminal proceeds to step 712. Alternatively, if the second threshold is not exceeded, the HPN terminal proceeds to step 714. As can be appreciated by the persons skilled in the art, in different embodiments, only one of the busy tone detection and PSD test might be carried out during step 602. Furthermore, different and/or additional methods of determining the availability of the sub-band may also be used.

Figure 8:
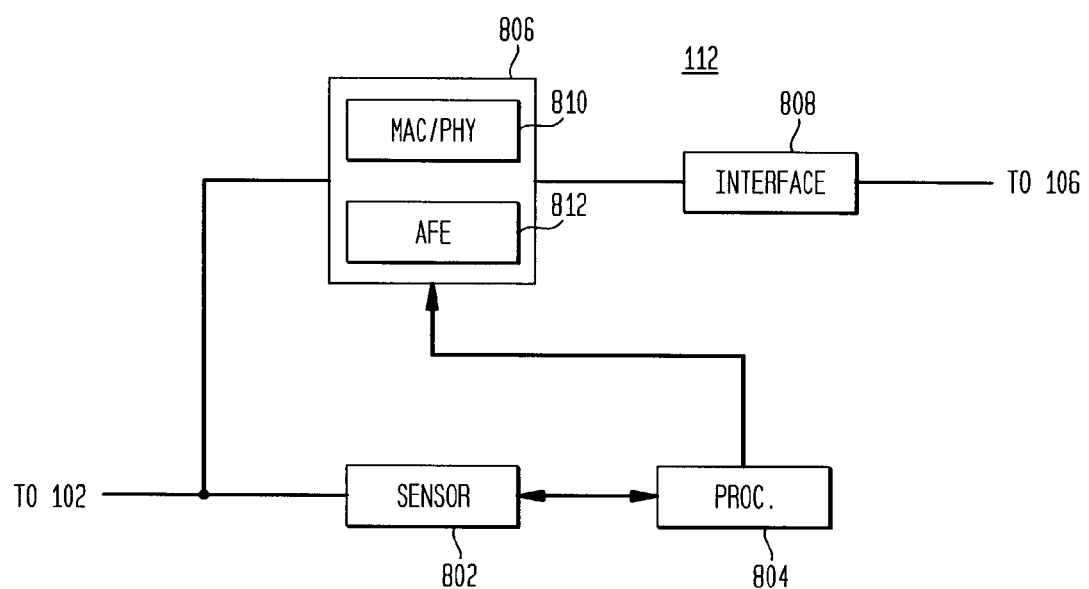
FIG. 8 shows an HPNA card that may be used in the network of FIG. 1 according to one embodiment of the present invention.

FIG. 8 shows HPNA card 112 according to one embodiment of the present invention. Card 112 comprises a sensor 802, a processor 804, an HPNA transceiver 806, and an interface 808. Sensor 802 is connected to wiring 102 of network 100 and is configured to perform the sensing step of method 600 on instructions from processor 804. Card 112 is connected to a networked device, e.g., computer 106, via interface 808. Transceiver 806 is coupled between interface 808 and wiring 102. Processor 804 is configured to perform the allocating step of method 600 and instructs transceiver 806, e.g., in step 610 or step 612, to transmit data according to the allocation.

In one embodiment, transceiver 806 conforms to HPNA Standards 1.0 and/or 2.0, the teachings of both of which are incorporated herein by reference. In one implementation, transceiver 806 has two modules: (1) a medium access control (MAC) and physical layer (PHY) signal processing module 810 and (2) an analog front end (AFE) module 812. MAC/PHY module 810 (i) employs IEEE-802.3 frames and the corresponding encoding/decoding and (ii) manages network access for transceiver 806, e.g., by implementing a CSMA/CD (carrier sense multiple access with collision detection) MAC protocol. AFE module 812 handles transmission/reception of signals over wiring 102 for transceiver 806. In a preferred implementation, AFE module 812 is designed to operate with a large insertion loss in the network wiring and can reliably receive signals of relatively low amplitude.

In one implementation, MAC/PHY module 810 conforms to HPNA Standard 1.0 and implements pulse position modulation (PPM) with a spectral efficiency of 0.16 bits/baud, resulting in a 1-Mbit/s data rate. Alternatively or in addition, MAC/PHY module 810 conforms to HPNA Standard 2.0, implements quadrature amplitude modulation (QAM) corresponding to a data rate of greater than or equal to 10 Mbit/s, and uses a distributed fair priority queuing (DFPQ) collision resolution algorithm. AFE module 812 operates with up to about 40-dB network wiring insertion loss and reliably receives signals of less than about 10 mV. For the transmit direction, AFE module 812 generates a peak-to-peak signal level of about 750 mV and power spectral density of about −74 dBm/Hz.

HPNA transceivers, such as transceiver 806, are known in the art and are available from a number of manufacturers. A representative example of such an HPNA transceiver may be a HomeLink™ PhoneLine 10M USB Network Adapter model SB200HA (HPNA 2.0) or model SB100H1 (HPNA 1.0) available from Linksys, Inc. of Irvine, Calif.

The present invention may provide one or more of the following benefits. HPN terminals configured in accordance with the principles of the present invention may improve data transmission for in-home communication systems. In particular, major impediments to HPN networking, such as crosstalk from neighboring home networks and signal attenuation due to the random topology of the in-home wiring, are mitigated by dynamically reallocating to the HPN terminals an available frequency sub-band, e.g., from the xDSL frequency range. Such reallocation, for example, improves signal-to-noise ratio of the transmitted signals. In addition, the bandwidth accessible to HPN terminals may be increased. As a result, the robustness of HPN networks is improved and higher data throughput rates may be supported. Furthermore, the present invention improves the "out-of-the-box" connectivity of HPN terminals to enrich the consumer experience with "trouble-free" home networking.

While this invention has been described with reference to illustrative embodiments, this description is not intended to be construed in a limiting sense. For example, the present invention may be practiced in variously configured HPN networks. Although the present invention has been described with reference to the HPNA v. 1.0 and 2.0 technologies, it may also be used with other versions of HPNA or analogous home phone-line networking technologies. Various methods of determining the availability of a desired frequency sub-band may be used as known in the art. One or more sub-bands may be used, which sub-bands may or may not form a continuous frequency band. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. In a home phone-line network (HPN) having two or more HPN terminals connected via telephone wiring, a method of data transmission between the terminals comprising the steps of:
   (A) partitioning the spectral bandwidth available to the HPN network into a plain-old-telephone-service (POTS) band, a first data communication band, and a second data communication band such that said POTS band and said first and second data communication bands do not overlap with one another, wherein:
      a voice communication service supported by the HPN network is adapted to use the POTS band;
      at least one HPN terminal is adapted to communicate with a communication device located outside of the HPN network using a data communication service that is designed to use the first data communication band, but not the second data communication band; and
      the HPN terminals are adapted to communicate with one another using the second data communication band;
   (B) determining whether transmission activity exists within a frequency sub-band of the first data communication band; and
   (C) allocating the sub-band for the HPN terminals to communicate with one another, if no transmission activity is detected within the sub-band in step (B).

2. The invention of claim 1, wherein:
   the HPN terminals are adapted to communicate with one another using the second data communication band as a default band; and
   step (B) comprises sensing transmission activity outside of the default band.

3. The invention of claim 1, wherein:
   the second data communication band is located between about 4 MHz and about 10 MHz; and
   the first data communication band has frequencies lower than the second data communication band.

4. The invention of claim 1, wherein:
   the first data communication service is a DSL service; and
   the HPN terminals are adapted to comply with a Home Phone-Line Networking Alliance (HPNA) standard.

5. The invention of claim 1, wherein step (C) comprises abandoning at least a portion of available bandwidth of the second data communication band, wherein the abandoned portion has no detected transmission activity.

6. The invention of claim 1, wherein step (C) comprises expanding the second data communication band to include at least a portion of the sub-band.

7. The invention of claim 1, further comprising the step of transmitting data between the HPN terminals using the second data communication band, if transmission activity is detected within the sub-band in step (B).

8. The invention of claim 1, wherein step (C) comprises transmitting at least a portion of data between the HPN terminals using at least a portion of the sub-band.

9. The invention of claim 1, wherein the sub-band corresponds to a broad-band service provided by a discrete multi-tone communication system and step (B) comprises detecting a busy tone corresponding to said system.

10. The invention of claim 1, wherein step (B) comprises:
    determining power spectral density (PSD) within the sub-band; and
    comparing the determined PSD with a threshold value.

11. The invention of claim 1, further comprising the step of repeating steps (B) and (C) for a different frequency sub-band of the first data communication band.

12. The invention of claim 1, wherein the sub-band includes a first frequency sub-band and a second frequency sub-band, the first and second sub-bands separated by a frequency interval, and step (C) comprises transmitting at least a portion of data between the terminals using at least a portion of the first and second sub-bands.

13. A networking device for use with a communication terminal, the terminal configurable for data transmission via a home phone-line network (HPN), the device comprising:
    (i) a sensor adapted to sense transmission activity within a frequency sub-band of a first data communication band; and
    (ii) a processor connected to the sensor and adapted to allocate the sub-band for data communication with another communication terminal of the HPN network, if no transmission activity is detected by the sensor within the sub-band, wherein the spectral bandwidth available to the HPN network is partitioned into a plain-old-telephone-service (POTS) band, the first data communication band, and a second data communication band such that said POTS band and said first and second data communication bands do not overlap with one another, wherein:
       a voice communication service supported by the HPN network is adapted to use the POTS band;
       at least one communication terminal of the HPN network is adapted to communicate with a communication device located outside of the HPN network using a data communication service that is designed to use the first data communication band, but not the second data communication band; and
       the communication terminals of the HPN network are adapted to communicate with one another using the second data communication band.

14. The invention of claim 13, wherein:
    the communication terminals of the HPN network are adapted to communicate with one another using the second data communication band as a default band; and
    the sensor is adapted to sense transmission activity outside of the default band.

15. The invention of claim 13, wherein:
    the second data communication band is located between about 4 MHz and about 10 MHz; and
    the first data communication band has frequencies lower than the second data communication band.

16. The invention of claim 13, wherein:
    the data communication service is a DSL service; and
    the communication terminals of the HPN network are adapted to comply with a Home Phone-Line Networking Alliance (HPNA) standard.

17. The invention of claim 13, further comprising a transceiver coupled to the HPN network, wherein the processor configures the transceiver to:
    transmit data to another communication terminal of the HPN network using the second data communication band, if transmission activity is detected by the sensor within the sub-band; and
    transmit at least a portion of data to another communication terminal of the HPN network using at least a portion of the sub-band, if no transmission activity is detected by the sensor within the sub-band.

18. The invention of claim 17, wherein the transceiver is adapted to abandon at least a portion of available bandwidth of the second data communication band, wherein the abandoned portion has no detected transmission activity.

19. The invention of claim 17, wherein the transceiver is adapted to expand the second data communication band to include at least a portion of the sub-band.

20. The invention of claim 17, wherein:
   the transceiver comprises:
      (i) a medium access control (MAC) and physical layer (PHY) signal processing module configured to implement encoding and decoding of data and manage network access for the networking device; and
      (ii) an analog front end (AFE) module designed to handle signals transmitted over the HPN network for the networking device; and
   the networking device conforms to an HPNA standard.

21. The invention of claim 13, wherein the sub-band corresponds to a broad-band service provided by a discrete multi-tone communication system and the sensor is configured to detect a busy tone corresponding to said system.

22. The invention of claim 13, wherein:
   the sensor is configured to determine power spectral density (PSD) within the sub-band; and
   the processor is configured to compare the determined PSD with a threshold value.

* * * * *